(12) United States Patent
Wu

(10) Patent No.: US 9,774,427 B2
(45) Date of Patent: Sep. 26, 2017

(54) METHOD OF HANDLING UPLINK/DOWNLINK CONFIGURATIONS FOR TIME-DIVISION DUPLEXING SYSTEM AND RELATED COMMUNICATION DEVICE

(71) Applicant: HTC Corporation, Taoyuan County (TW)

(72) Inventor: Chih-Hsiang Wu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 90 days.

(21) Appl. No.: 14/501,069

(22) Filed: Sep. 30, 2014

(65) Prior Publication Data

US 2015/0098366 A1 Apr. 9, 2015

Related U.S. Application Data

(60) Provisional application No. 61/886,074, filed on Oct. 3, 2013.

(51) Int. Cl.
*H04L 5/00* (2006.01)
*H04B 7/26* (2006.01)
(Continued)

(52) U.S. Cl.
CPC ......... *H04L 5/0035* (2013.01); *H04B 7/2656* (2013.01); *H04L 5/0073* (2013.01); *H04L 5/1469* (2013.01); *H04W 76/028* (2013.01)

(58) Field of Classification Search
CPC . H04W 72/042; H04W 76/028; H04W 88/02; H04L 5/0035; H04L 5/0073;
(Continued)

(56) References Cited

U.S. PATENT DOCUMENTS

| 8,958,349 B2 * | 2/2015 | Wang | H04W 72/04 370/280 |
| 9,351,185 B2 * | 5/2016 | Charbit | H04W 24/10 |

(Continued)

FOREIGN PATENT DOCUMENTS

| CN | 101171773 A | 4/2008 |
| CN | 102594436 A | 7/2012 |
| CN | 102594438 A | 7/2012 |

OTHER PUBLICATIONS

3GPP TS 36.331 V11.5.0 (Sep. 2013), "3rd Generation Partnership Project; Technical Specification Group Radio Access Network; Evolved Universal Terrestrial Radio Access (E-UTRA); Radio Resource Control (RRC); Protocol specification (Release 11)", pp. 1-347.

(Continued)

*Primary Examiner* — Luat Phung
*Assistant Examiner* — Thomas R Cairns
(74) *Attorney, Agent, or Firm* — Winston Hsu

(57) ABSTRACT

A method of handling an uplink/downlink (UL/DL) configuration for a communication device includes receiving a first UL/DL configuration in first system information from a first cell in an idle mode; applying the first UL/DL configuration; receiving a second UL/DL configuration on a physical DL control channel from the first cell in a connected mode; applying the second UL/DL configuration; receiving a third UL/DL configuration in second system information from the first cell in the connected mode; and applying the third UL/DL configuration.

14 Claims, 7 Drawing Sheets

(51) Int. Cl.
*H04W 76/02* (2009.01)
*H04L 5/14* (2006.01)

(58) Field of Classification Search
CPC . H04L 5/14; H04L 5/1469; H04J 3/00; H04B 7/2656
See application file for complete search history.

(56) References Cited

U.S. PATENT DOCUMENTS

| | | | |
|---|---|---|---|
| 2012/0230273 A1 | 9/2012 | He | |
| 2013/0336296 A1* | 12/2013 | Dinan | H04W 72/0406 370/336 |
| 2015/0029910 A1* | 1/2015 | He | H04W 76/02 370/280 |
| 2015/0063180 A1* | 3/2015 | Chen | H04L 1/1822 370/280 |
| 2015/0237610 A1* | 8/2015 | Zhang | H04W 72/0406 370/280 |
| 2015/0312936 A1* | 10/2015 | Nguyen | H04L 1/0061 370/280 |
| 2015/0327324 A1* | 11/2015 | Wei | H04W 52/0235 370/280 |

OTHER PUBLICATIONS

3GPP TR 36.828 V11.0.0 (Jun. 2012), "3rd Generation Partnership Project; Technical Specification Group Radio Access Network; Evolved Universal Terrestrial Radio Access (E-UTRA); Further enhancements to LTE Time Division Duplex (TDD) for Downlink-Uplink (DL-UL) interference management and traffic adaptation (Release 11)", pp. 1-109.

Office action dated Jul. 14, 2017 for the China application No. 201410525154.2, filed Oct. 8, 2014, p. 1-8.

* cited by examiner

| UL/DL configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

FIG. 1 PRIOR ART

METHOD OF HANDLING UPLINK/DOWNLINK CONFIGURATIONS FOR TIME-DIVISION DUPLEXING SYSTEM AND RELATED COMMUNICATION DEVICE

CROSS REFERENCE TO RELATED APPLICATIONS

This application claims the benefit of U.S. Provisional Application No. 61/886,074, filed on Oct. 3, 2013 and incorporated herein by reference.

BACKGROUND OF THE INVENTION

1. Field of the Invention

The present invention relates to a method for a time-division duplexing (TDD) system and related communication device, and more particularly, to a method of handling uplink/downlink configuration for the TDD system and related communication device.

2. Description of the Prior Art

A long-term evolution (LTE) system supporting the 3rd Generation Partnership Project (3GPP) Rel-8 standard and/or the 3GPP Rel-9 standard are developed by the 3GPP as a successor of the universal mobile telecommunication system (UMTS) for further enhancing performance of the UMTS to satisfy increasing needs of users. The LTE system includes a new radio interface and a new radio network architecture that provides high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and for communicating with a core network including a mobility management entity (MME), a serving gateway, etc., for Non-Access Stratum (NAS) control.

A LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (CoMP) transmissions/reception, uplink (UL) multiple-input multiple-output (UL-MIMO), etc. For a UE and an eNB to communicate with each other in the LTE-A system, the UE and the eNB must support standards developed for the LTE-A system, such as the 3GPP Rel-10 standard or later versions.

Different from the LTE/LTE-A system operating in a frequency-division duplexing (FDD) mode (or simply FDD system), transmission directions of subframes of a frequency band in the LTE/LTE-A system operating in a time-division duplexing (TDD) mode (or simply TDD system) may be different. That is, the subframes in the same frequency band are divided into UL subframes, downlink (DL) subframes and special subframes according to the UL/DL configuration specified in the 3GPP standard.

FIG. 1 is a table 102 of the UL/DL configurations with subframes and corresponding directions. In FIG. 1, 7 UL/DL configurations are shown, wherein each of the UL/DL configurations indicates a set of transmission directions (hereinafter, directions, for short) for 10 subframes, respectively. Each subframe is indicated by a corresponding subframe number (i.e., subframe index) in FIG. 1. In detail, "U" represents that the subframe is a UL subframe where UL data is transmitted, and "D" represents that the subframe is a DL subframe where DL data is transmitted. "S" represents that the subframe is a special subframe where control information and maybe data (according to the special subframe configuration) are transmitted, and the special subframe can also be seen as the DL subframe in the prior art.

Note that the eNB may configure a UL/DL configuration to a UE via a higher layer signaling (e.g., System Information Block Type 1 (SIB1)) or a physical layer signaling (e.g., DL control information (DCI)). The UE applies the UL/DL configuration to communicate with the eNB. That is, the UE considers a subframe as an UL, DL or special subframe according to the UL/DL configuration. The UE receives in DL subframes and/or special subframes, and transmit in UL subframes.

In an example, the UL/DL configuration 1 is configured to a UE via system information (e.g. SystemInformationBlocktype1) from a cell of an eNB. In this example, the UE supports enhanced interference management & traffic adaptation (eIMTA) and the cell configures the UL/DL configuration 4 (e.g. via a physical downlink control channel (PDCCH) or an enhanced PDCCH (EPDCCH)) to the UE according to rapid changes of traffic loads on the UL and the DL. After a while, the cell indicates the UL/DL configuration 2 according to long term changes of traffic loads on the UL and the DL. In such a condition, if the UE supporting the eIMTA remains applying the UL/DL configuration 4, the UE cannot receive the PDCCH in the subframe 3. Further, the UE also cannot transmit a physical uplink shared channel (PUSCH) in the subframe 7 even if the UE receives a UL grant for transmitting the PUSCH in the subframe 7.

In another example, a cell of an eNB indicates the UL/DL configuration 1 to a UE supporting the eIMTA via the SystemInformationBlocktype1 and configures the UL/DL configuration 4 to the UE via the PDCCH or the EPDCCH according to the rapid changes of traffic loads on the UL and the DL. Under a condition that a radio link failure occurs in the UE and the UE performs a radio resource control (RRC) reestablishment procedure to recover the radio link, the UE would keep applying the UL/DL configuration 4 since the UE is in an RRC connected mode when performing the RRC connection reestablishment procedure. In this example, the UE may select another cell configuring the UL/DL configuration 2 in the SystemInformationBlocktype1. When the UE transmits a preamble to the cell for performing the RRC connection reestablishment procedure and the cell feedback a random access response in the subframe 3, the UE cannot receive the random access responses transmitted in the subframe 3 since the UE regards the subframe 3 as the UL subframe. In such a condition, the RRC re-establishment procedure may fail.

As can be seen from the above, the inconsistency between the UL/DL configurations indicated in the system information and on the DL channel (e.g. a PDCCH or an EPDCCH) for the UE supporting eIMTA is an important issue to be discussed.

SUMMARY OF THE INVENTION

In order to solve the abovementioned problem, the present invention provides a method for handling UL/DL configurations in a time-division duplexing (TDD) system and related communication device.

An embodiment discloses a method of handling an unlink/downlink (UL/DL) configuration for a communication device, the method comprising receiving a first UL/DL configuration in first system information from a first cell in an idle mode; applying the first UL/DL configuration; receiving a second UL/DL configuration on a physical DL control channel from the first cell in a connected mode; applying the second UL/DL configuration; receiving a third UL/DL configuration in second system information from the first cell in the connected mode; and applying the third UL/DL configuration.

Another embodiment discloses a method of handling an unlink/downlink (UL/DL) configuration for a communication device, the method comprising receiving a first UL/DL configuration in first system information from a first cell in an idle mode; applying the first UL/DL configuration; receiving a second UL/DL configuration on a physical DL control channel from the first cell in a connected mode; applying the second UL/DL configuration; performing a radio resource control (RRC) connection reestablishment procedure with a second cell; and applying the first UL/DL configuration when performing the RRC connection reestablishment procedure with the second cell.

The present invention further discloses a communication device for a wireless communication system, comprising a processing means; and a storage unit, coupled to the processing means, for storing a program code, wherein the program code instructs the processing means to execute the following step: receiving a first UL/DL configuration in first system information from a first cell in an idle mode; applying the first UL/DL configuration; receiving a second UL/DL configuration on a physical DL control channel from the first cell in a connected mode; applying the second UL/DL configuration; receiving a third UL/DL configuration in second system information from the first cell in the connected mode; and applying the third UL/DL configuration.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a table of the UL/DL configurations with subframes and corresponding directions.

DETAILED DESCRIPTION

Figure 2:
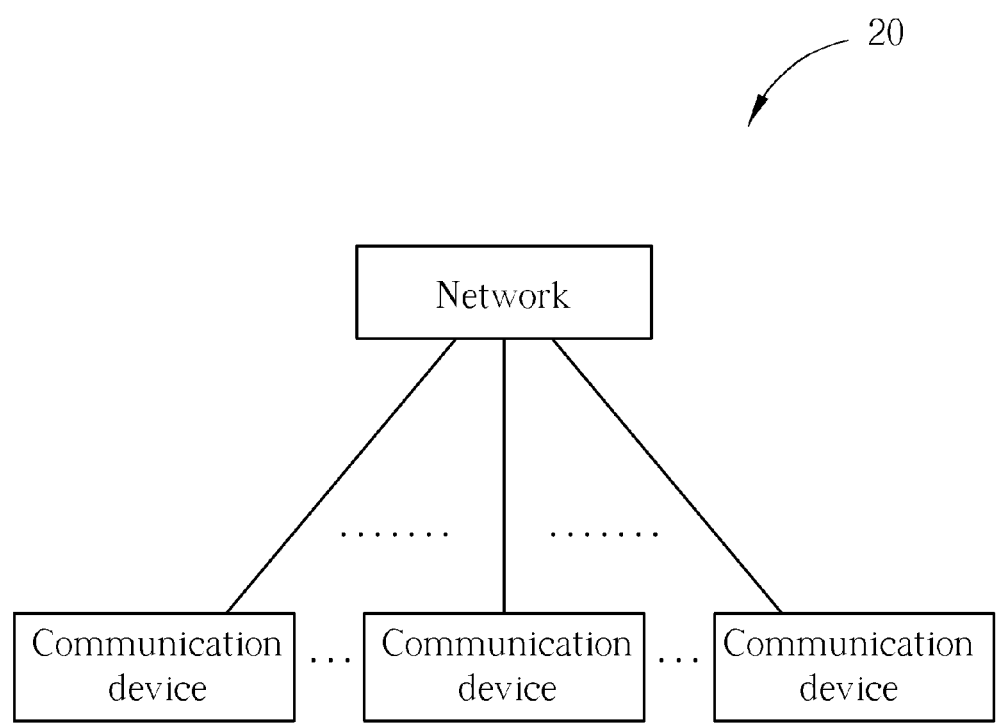
FIG. 2 is a schematic diagram of a wireless communication system according to an example of the present invention.

FIG. 2 is a schematic diagram of a wireless communication system 20 according to an example of the present invention. The wireless communication system 20 is briefly composed of a network and a plurality of communication devices. The wireless communication system 20 supports a time-division duplexing (TDD) mode (i.e., TDD system) and enhanced interference management & traffic adaptation (eIMTA). That is, the network and a communication device may communicate with each other by using uplink (UL) subframes and downlink (DL) subframes according to one or more UL/DL configurations and the network may adjust the UL/DL configuration of the communication device via a DL channel (e.g. a physical downlink control channel (PDCCH) or an enhanced PDCCH (EPDCCH)) according to rapid changes of traffic loads on the UL and the DL.

In FIG. 2, the network and the communication devices are simply utilized for illustrating the structure of the wireless communication system 20. Practically, the network may be a universal terrestrial radio access network (UTRAN) comprising a plurality of Node-Bs (NBs) in a universal mobile telecommunications system (UMTS). In another example, the network may be an evolved UTRAN (E-UTRAN) comprising a plurality of evolved NBs (eNBs) and/or relays in a long term evolution (LTE) system, a LTE-Advanced (LTE-A) system or an evolution of the LTE-A system.

Furthermore, the network may also include both the UTRAN/E-UTRAN and a core network, wherein the core network includes network entities such as Mobility Management Entity (MME), Serving Gateway (S-GW), Packet Data Network (PDN) Gateway (P-GW), Self-Organizing Networks (SON) server and/or Radio Network Controller (RNC), etc. In other words, after the network receives information transmitted by a communication device, the information may be processed only by the UTRAN/E-UTRAN and decisions corresponding to the information are made at the UTRAN/E-UTRAN. Alternatively, the UTRAN/E-UTRAN may forward the information to the core network, and the decisions corresponding to the information are made at the core network after the core network processes the information. In addition, the information may be processed by both the UTRAN/E-UTRAN and the core network, and the decisions are made after coordination and/or cooperation are performed by the UTRAN/E-UTRAN and the core network. A communication device may be a user equipment (UE), a half-duplex UE, a mobile phone, a laptop, a tablet computer, an electronic book or a portable computer system but is not limited. In addition, the network and the communication device may be seen as a transmitter or a receiver according to direction, e.g., for a UL, the communication device is the transmitter and the network is the receiver, and for a DL, the network is the transmitter and the communication device is the receiver. More specifically, for the network, the direction of the transmission is DL, and the direction of the reception is UL. For the communication device, the direction of the transmission is UL, and the direction of the reception is DL.

Figure 3:
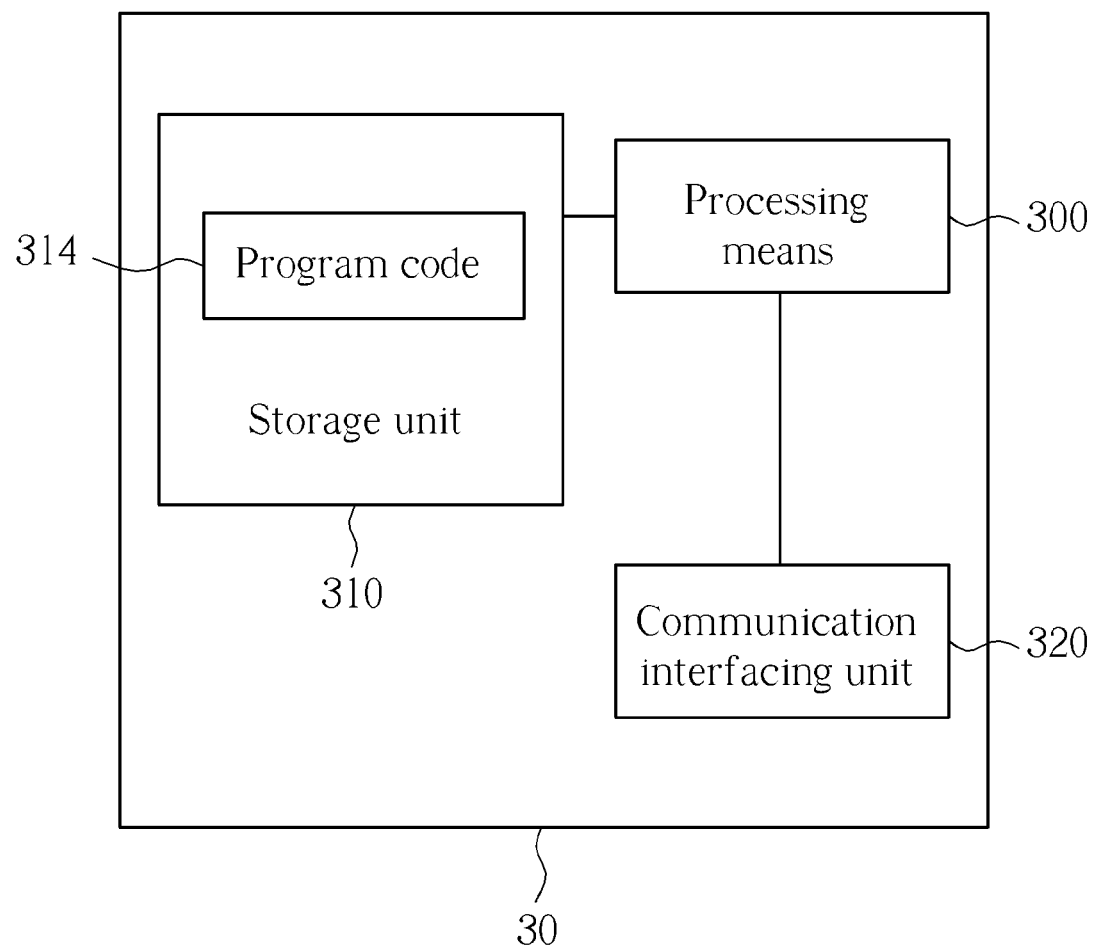
FIG. 3 is a schematic diagram of a communication device according to an example of the present invention.

FIG. 3 is a schematic diagram of a communication device 30 according to an example of the present invention. The communication device 30 may be a communication device or the network shown in FIG. 2, but is not limited herein. The communication device 30 may include a processing means 300 such as a microprocessor or Application Specific Integrated Circuit (ASIC), a storage unit 310 and a communication interfacing unit 320. The storage unit 310 may be any data storage device that stores a program code 314, accessed and executed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk and optical data storage device. The communication interfacing unit 320 is preferably a transceiver and is used to transmit and receive signals (e.g., messages or packets) according to processing results of the processing means 300.

Figure 4:
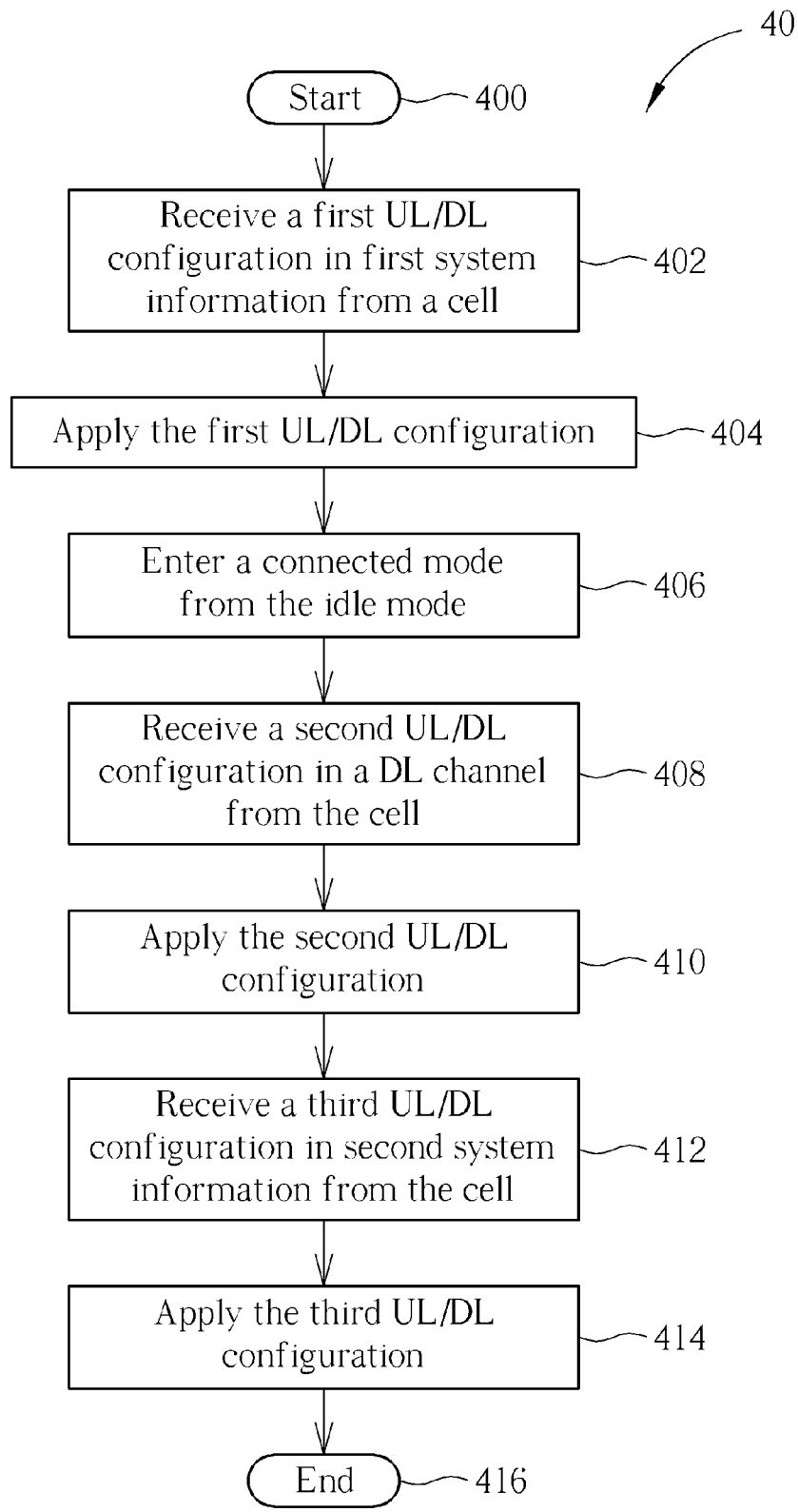
FIG. 4 is a flowchart of a process according to an example of the present invention.

Please refer to FIG. 4, which is a flowchart of a process 40 according to an example of the present invention. The process 40 may be utilized in a communication device shown in FIG. 2 for handling the UL/DL configuration. The process 40 may be compiled into the program code 314 and comprises the following steps:

Step 400: Start.

Step 402: Receive a first UL/DL configuration in first system information from a cell in an idle mode.

Step 404: Apply the first UL/DL configuration.

Step 406: Enter a connected mode from the idle mode.

Step 408: Receive a second UL/DL configuration in a physical layer signaling on a DL channel from the cell in the connected mode.

Step 410: Apply the second UL/DL configuration.

Step 412: Receive a third UL/DL configuration in second system information from the cell after the second UL/DL configuration is received.

Step 414: Apply the third UL/DL configuration.

Step 416: End.

According to the process 40, abase station configures a first UL/DL configuration to the communication device via first system information (e.g. SystemInformationBlocktype1 or SystemInformationBlocktype2) of a cell. The communication device camping on the cell receives the first UL/DL configuration in the first system information in an idle mode and applies the first UL/DL configuration to communicate with the base station via the cell. The communication device enters a connected mode and communicates with the cell according to the first UL/DL configuration when the communication device establishes an RRC connection with the base station via the cell. Since the communication device supports eIMTA, the base station may configure a second UL/DL configuration to the communication device via physical layer signaling (e.g. downlink control information (DCI)) on a DL channel (e.g. a physical downlink control channel (PDCCH) or an enhanced PDCCH (EPDCCH)) of the cell according to the rapid changes of the traffic loads on the UL and the DL when the communication device is in the connected mode. For example, the communication device in the connected mode may receive a radio resource control (RRC) message (e.g. RRCConnectionRecofiguration message) comprising an eIMTA configuration. The eIMTA configuration is utilized for indicating the communication device to receive the second UL/DL configuration from the PDCCH or the EPDCCH of the cell. In an example, the eIMTA configuration comprises a radio network temporary identifier (RNTI) for receiving the second UL/DL configuration. The communication device applies the second UL/DL configuration instead of the first UL/DL configuration to communicate with the bases station via the cell when the communication device receives the second UL/DL configuration in the connected mode.

Next, the base station may configure a third UL/DL configuration in second system information of the cell according to long term changes of the traffic loads on the UL and the DL. In such a condition, the communication device in the connection mode applies the third UL/DL configuration of the second system information to communicate with the base station via the cell. Hence, this avoids the communications between the base station and the communication device operate abnormally. In other words, the communication device in the connected mode discards the second UL/DL configuration indicated in the physical layer signaling.

In an example, a base station configures the UL/DL configuration 1 via broadcasting the SystemInformationBlocktype1 on a cell and indicates the UL/DL configuration 4 to a communication device on the PDCCH of the cell according to the rapid changes of the traffic loads on the UL and the DL. After a while, the base station configures the UL/DL configuration 2 via broadcasting the SystemInformationBlocktype1 according to the long term changes of the traffic loads on the UL and the DL. If the communication device remains applying the UL/DL configuration 4, the communication device cannot receive the PDCCH transmitted in the subframe 3 and cannot transmit the physical uplink shared channel (PUSCH) in the subframe 7 even if the communication device receives the UL grant for the transmission of the PUSCH. According to the process 40, the communication device applies the UL/DL configuration 2 when receiving the SystemInformationBlocktype1 indicating the UL/DL configuration 2. That is, the communication device in the connected mode applies the UL/DL configuration indicated in the system information when the UL/DL configuration indicated in the system information changes. As a result, the communications between the communication device and the base station avoid operating abnormally and the inconsistency between the UL/DL configurations indicated in the system information and on the DL channel (e.g. the PDCCH or the EPDCCH) for the communication device supporting eIMTA can be solved.

According to different applications and design concepts, the process 40 may be appropriately modified. For example, when the communication device receives the third UL/DL configuration, the communication device determines whether to apply the third UL/DL configuration based on whether the third UL/DL configuration equals the first UL/DL configuration. When the third UL/DL configuration is different from the first UL/DL configuration, the communication device applies the third UL/DL configuration; and when the third UL/DL configuration and the first UL/DL configuration are the same, the communication device keeps applying the second UL/DL configuration. In other words, the communication device applies the UL/DL configuration of the system information when the UL/DL configuration indicated in the system information changes. As a result, the problem of the inconsistency between the UL/DL configurations indicated in the system information and that indicated on the DL channel for the UE supporting eIMTA can be also solved.

Figure 5:
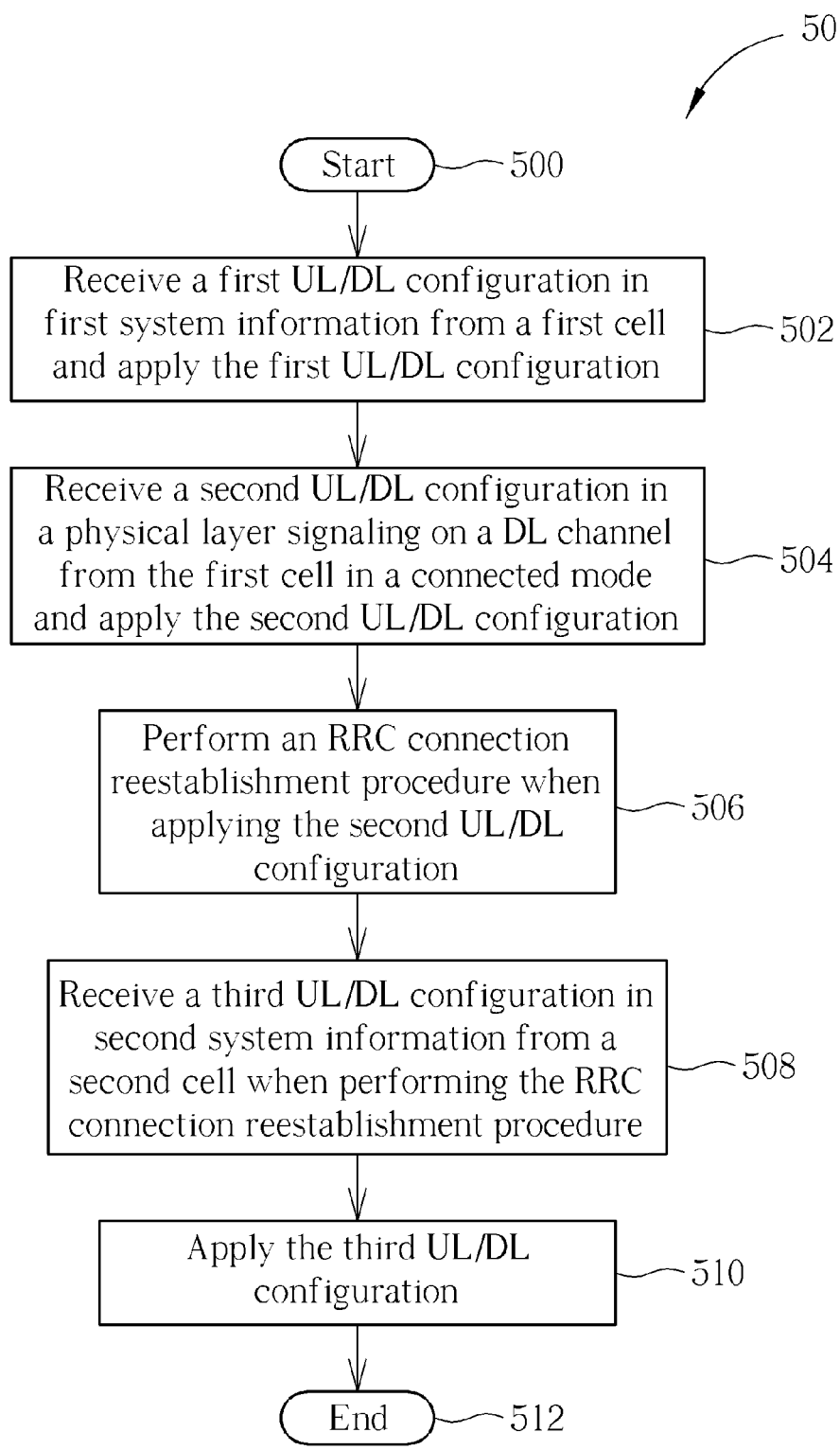
FIG. 5 is a flowchart of a process according to another example of the present invention.

Please refer to FIG. 5, which is a flowchart of a process 50 according to an example of the present invention. The process 50 can be utilized in a communication device shown in FIG. 2 for handling the UL/DL configuration. The process 50 may be compiled into the program code 314 and comprises the following steps:

Step 500: Start.

Step 502: Receive a first UL/DL configuration in first system information from a first cell and apply the first UL/DL configuration.

Step 504: Receive a second UL/DL configuration in a physical layer signaling on a DL channel from the first cell in a connected mode and apply the second UL/DL configuration.

Step 506: Perform an RRC connection reestablishment procedure when applying the second UL/DL configuration.

Step 508: Receive a third UL/DL configuration in second system information from a second cell when performing the RRC connection reestablishment procedure.

Step 510: Apply the third UL/DL configuration.

Step 512: End.

According to the process 50, the communication device receives a first UL/DL configuration in first system information (e.g. SystemInformationBlocktype1 or SystemInformationBlocktype2) from a first cell of a first base station in an idle mode. The communication device in connected mode applies the first UL/DL configuration to communicate with the first base station via the first cell. Since the communication device supports eIMTA, the first base station may configure a second UL/DL configuration to the communication device, via a DL channel (e.g. the PDCCH or the EPDCCH) of the first cell, in a connected mode according to the rapid changes of the traffic loads on the UL and the DL. Similar to the process 40 shown in FIG. 4, the communication device may receive an RRC message (e.g. RRCConnectionRecofiguration message) comprising the eIMTA configuration for indicating the communication device to receive the second UL/DL configuration from the PDCCH or the EPDCCH of the first cell. The eIMTA configuration may further comprise an RNTI for receiving the second UL/DL configuration. The communication device applies the second UL/DL configuration to communicate with the first base station via the first cell instead of the first UL/DL configuration when the communication device receives the second UL/DL configuration in the connected mode.

The communication device performs an RRC connection reestablishment procedure to recover RRC connection when detecting at least one of a radio link failure, an integrity check failure and an RRC connection reconfiguration failure occurs. When performing the RRC connection reestablishment procedure, the communication device may transmit a request message (e.g. an RRCConnectionReestablishmentRequest message) to a second cell controlled by the first base station or a second base station and receive second system information with a third UL/DL configuration from the second cell. In such a condition, the communication device applies the third UL/DL configuration to avoid the communications operate abnormally between the communication device and the second cell. The first or second base station applies the third UL/DL configuration to communicate with the communication device via the second cell. The first or second base station should not transmit an RRCConnectionReestablishment message in a subframe indicated as a DL subframe in the second UL/DL configuration but indicated as an UL subframe in the third UL/DL configuration. Note that, if the first cell and the second cell are the same (i.e. the communication device performs the RRC connection reestablishment procedure with the first cell), the communication device may still apply the third UL/DL configuration to avoid the RRC connection reestablishment procedure fails.

Further, when the RRC connection reestablishment procedure is triggered (e.g. the radio link failure is detected), the communication device may release the eIMTA configuration and/or the second UL/DL configuration to improve the network efficiency.

As to the detail operations of the process 50 please refer to the following descriptions. In an example, a first base station configures the UL/DL configuration 1 via broadcasting the SystemInformationBlocktype1 on a first cell and indicates the UL/DL configuration 4 to a communication device in the PDDCH or the EPDCCH according to the rapid changes of the traffic loads on the UL and the DL. A radio link failure occurs in the communication device and an RRC connection reestablishment procedure is accordingly triggered in the communication device to recover the radio link. The communication device receives the UL/DL configuration 2 in the SystemInformationBlocktype1 broadcasted on a second cell controlled by the first or a second base station. The communication device transmits a preamble to the second cell to perform a random access procedure to transmit an RRCConnectionReestablishmentRequest message. If the communication device keeps applying the UL/DL configuration 4, the communication device may not be capable of receiving a random access response corresponding to the preamble in the subframe 3 and the random access procedure of the RRC connection reestablishment procedure may fail. According to the process 50, the communication device applies the UL/DL configuration 2 which is indicated by the SystemInformationBlocktype1 broadcasted by the second cell and the RRC connection reestablishment procedure can be successfully accomplished.

Figure 6:
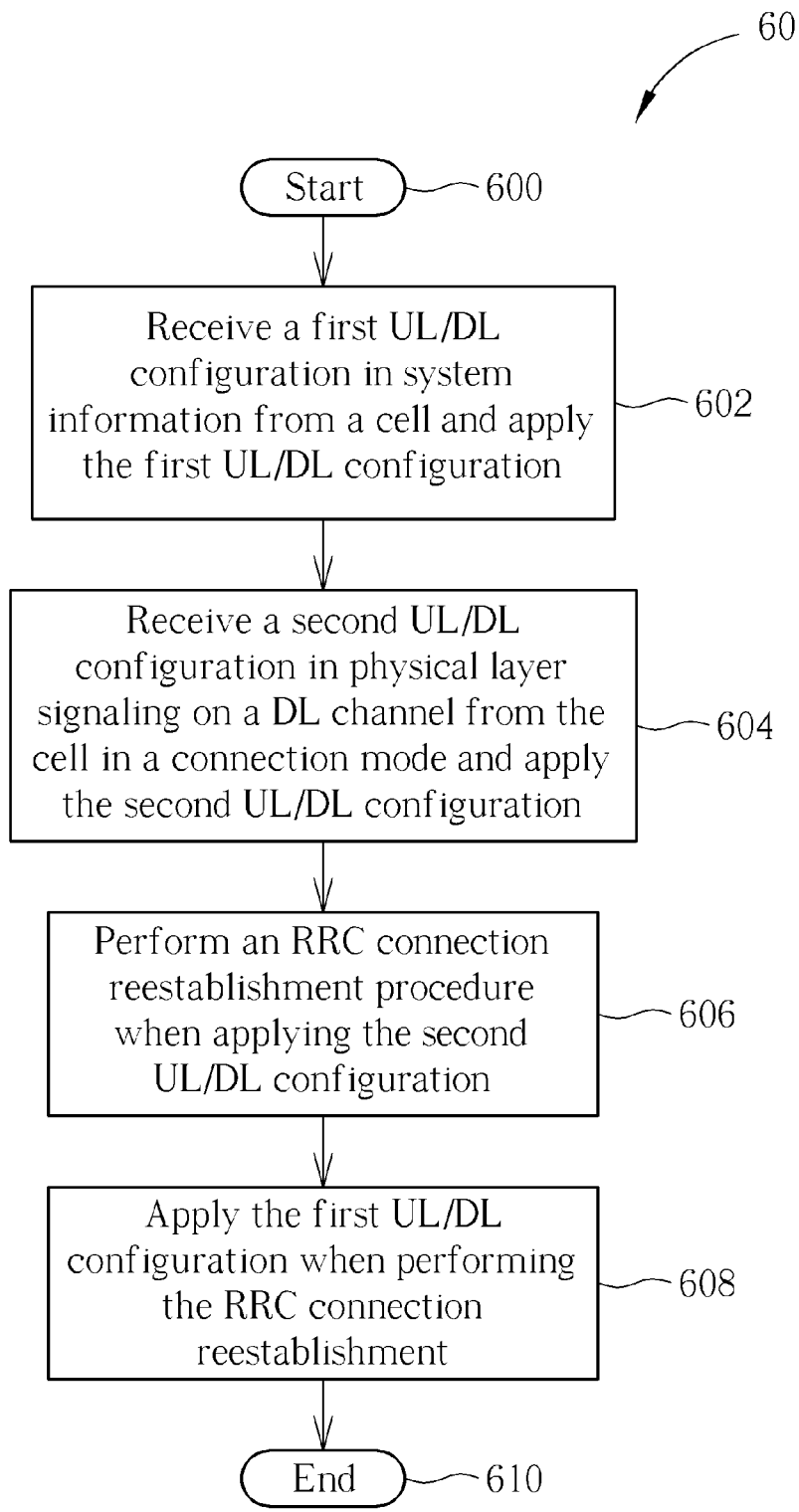
FIG. 6 is a flowchart of a process according to another example of the present invention.

Please refer to FIG. 6, which is a flowchart of a process 60 according to an example of the present invention. The process 60 may be utilized in a communication device shown in FIG. 2 for handling the UL/DL configuration. The process 60 may be compiled into the program code 314 and comprises the following steps:

Step 600: Start.

Step 602: Receive a first UL/DL configuration in system information from a cell and apply the first UL/DL configuration.

Step 604: Receive a second UL/DL configuration in physical layer signaling on a DL channel from the cell in a connection mode and apply the second UL/DL configuration.

Step 606: Perform an RRC connection reestablishment procedure when applying the second UL/DL configuration.

Step 608: Apply the first UL/DL configuration when performing the RRC connection reestablishment.

Step 610: End.

According to the process 60, the communication device receives a first UL/DL configuration in first system information (e.g. SystemInformationBlocktype1 or SystemInformationBlocktype2) from a cell of a base station in an idle mode. The communication device in a connected mode applies the first UL/DL configuration to communicate with the base station via the cell. Since the communication device supports eIMTA, the cell may configure a second UL/DL configuration to the communication device, via the DL channel of the cell, in a connected mode according to the rapid changes of the traffic loads on the UL and the DL. Similar to the process 50 shown in FIG. 5, the communication device may receive an RRC message (e.g. RRCConnectionRecofiguration message) comprising the eIMTA configuration for indicating the communication device to receive the second UL/DL configuration from the PDCCH or the EPDCCH of the cell. The eIMTA configuration may further comprise an RNTI for receiving the second UL/DL configuration. The communication device applies the second UL/DL configuration instead of the first UL/DL configuration to communicate with the base station via the cell when the communication device receives the second UL/DL configuration in the connected mode.

The communication device is required to perform an RRC connection reestablishment procedure to recover the RRC connection when detecting at least one of a radio link failure, an integrity check failure and an RRC connection reconfiguration failure occurs. In comparison with the process 50 shown in FIG. 5, the communication device performs the RRC connection reestablishment procedure with the same cell in the process 60. In such a condition, the communication device changes to apply the first UL/DL configuration received in the first system information to avoid the RRC connection reestablishment procedure fails. That is, the communication device applies the UL/DL configuration indicated in the first system information when the RRC connection reestablishment procedure is triggered. The base station applies the first UL/DL configuration to communicate with the communication device via the cell. The base station should not transmit an RRCConnectionReestablishment message in a subframe indicated as a DL subframe in the second UL/DL configuration but indicated as an UL subframe in the first UL/DL configuration. The problem of the inconsistency between the UL/DL configurations indicated in the system information and that indicated on the DL channel for the UE supporting eIMTA can be solved, therefore.

Further, the communication device may release the eIMTA configuration when the RRC connection reestablishment procedure is triggered (e.g. the radio link failure an integrity check failure or an RRC connection reconfiguration failure is detected), to improve the network efficiency.

As to the detail operations of the process 60 please refer to the following example. A base station configures the UL/DL configuration 1 via broadcasting the SystemInformationBlocktype1 on a cell and indicates the UL/DL configuration 4 to a communication device configured the eIMTA in the PDDCH or the EPDCCH according to the rapid changes of the traffic loads on the UL and the DL. Under certain conditions, a radio link failure occurs in the communication device and an RRC connection reestablishment procedure is accordingly triggered to recover the radio link. The communication device transmits a request message (e.g. an RRCConnectionReestablishmentRequest message) to the same cell to perform the RRC connection reestablishment procedure. In such a condition, the communication device changes to apply the UL/DL configuration 1 to avoid the communications between the communication device and the cell operate abnormally.

According to different applications and design concepts, the process 60 may be appropriately modified. For example, the communication device may determine whether the first system information is valid before applying the first UL/DL configuration of the first system information. In an example, the communication device determines whether the first system information is valid according to a first value tag (e.g. systemInfoValueTag) in the first system information, wherein the first value tag changes when the system information of the cell varies. If a second value tag currently broadcasted by the cell is equal to the first value tag, the communication device determines the system information of the cell keeps the same with the first system information broadcasted before performing the RRC connection reestablishment procedure (i.e. the first system information is valid) and applies the first UL/DL configuration indicated by the first system information; and if the first value tag is different from the second value tag, the communication device determines the system information of the cell changed within the period during the RRC connection reestablishment procedure (i.e. the first system information is not valid), afresh receives a second system information from the cell and applies a third UL/DL configuration of the second system information.

Those skilled in the art should readily make combinations, modifications and/or alterations on the abovementioned description and examples. The abovementioned steps of the processes including suggested steps may be realized by means that could be a hardware, a firmware known as a combination of a hardware device and computer instructions and data that reside as read-only software on the hardware device, or an electronic system. Examples of hardware may include analog, digital and mixed circuits known as microcircuit, microchip, or silicon chip. Examples of the electronic system may include a system on chip (SOC), system in package (SIP), a computer on module (COM), and the communication device 30.

Figure 7:
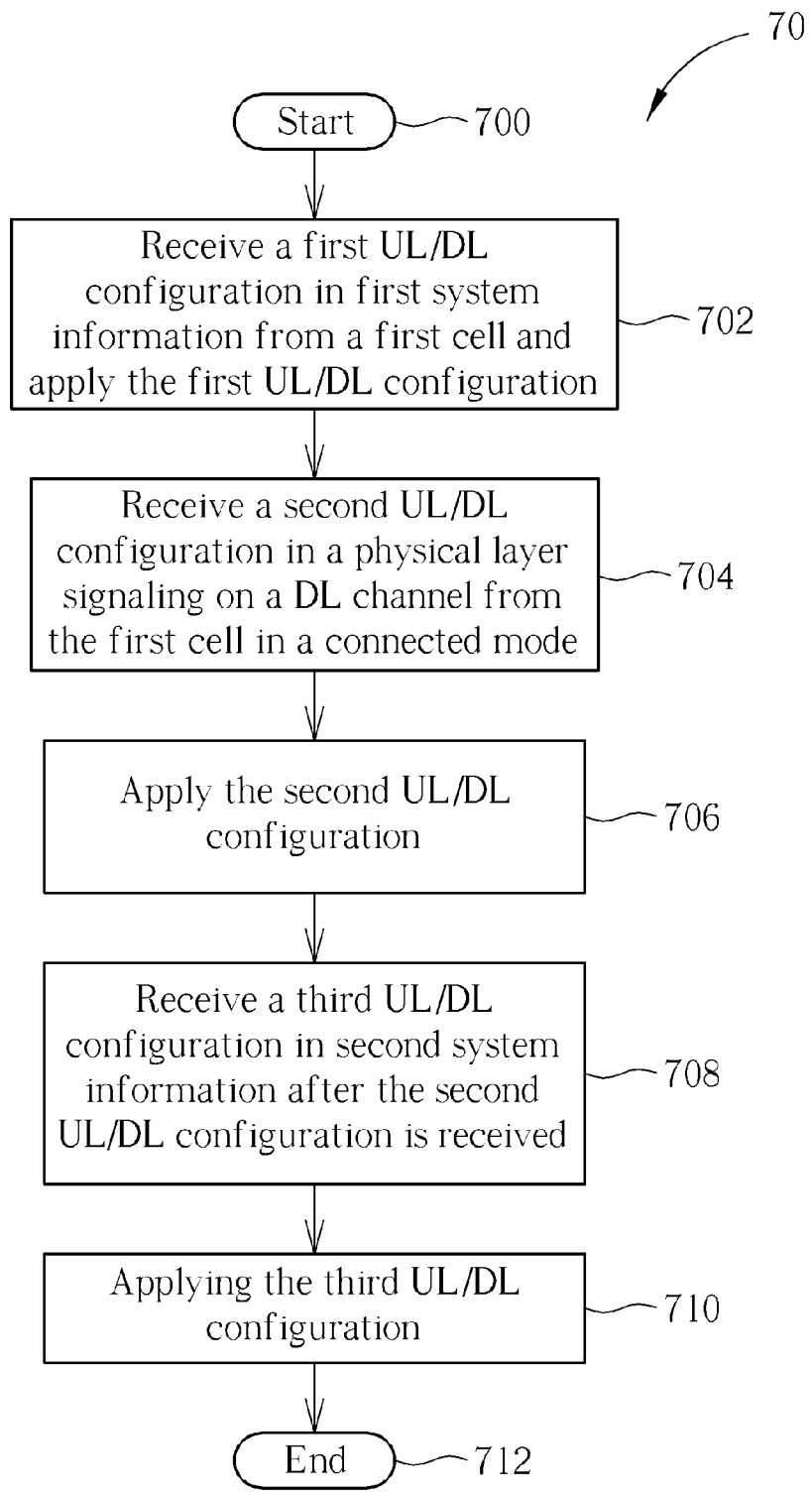
FIG. 7 is a flowchart of a process according to another example of the present invention.

According to different design concepts, the processes 40 and 50 of the above embodiment may be summarized into a process 70 as shown in FIG. 7. The process 70 may be utilized in a communication device shown in FIG. 2 for handling the UL/DL configuration. The process 70 may be compiled into the program code 314 and comprises the following steps:

Step 700: Start.
Step 702: Receive a first UL/DL configuration in first system information from a first cell and apply the first UL/DL configuration.
Step 704: Receive a second UL/DL configuration in a physical layer signaling on a DL channel from the first cell in a connected mode.
Step 706: Apply the second UL/DL configuration.
Step 708: Receive a third UL/DL configuration in second system information after the second UL/DL configuration is received.
Step 710: Applying the third UL/DL configuration.
Step 712: End.

According to the process 70, a first base station configures a first UL/DL configuration to a communication device via first system information on a first cell. In this example, the communication device supports the eIMTA and the first base station configures a second UL/DL configuration to the communication device via physical layer signaling on a DL channel (e.g. the PDCCH or the EPDCCH) of the first cell according to the rapid changes of the traffic loads on the UL and DL. The communication device accordingly adopts the second UL/DL configuration to communicate with the first base station via the first cell. Next, the communication device receives a third UL/DL configuration in second system information and applies the third UL/DL configuration to avoid the communications between the first cell and the communication device operates abnormally.

Note that, the second system information may be transmitted by the first cell of the first base station due to the long term changes of the traffic loads on the UL and the DL (e.g. the process 40) or by a second cell of the first or a second base station while the communication device performs an RRC connection reestablishment procedure to recover the RRC connection (e.g. the process 50). In an example, if the second system information is transmitted from the first cell, the communication device applies the third UL/DL configuration when the third UL/DL configuration is different from the first UL/DL configuration and keeps applying the second UL/DL configuration when the third UL/DL configuration and the first UL/DL configuration are the same. In another example that the second system information is transmitted by the second cell while the communication device performs an RRC connection reestablishment procedure to recover the RRC connection, the communication device applies the third UL/DL configuration. As a result, the problem of the inconsistency between the UL/DL configurations indicated in the system information and that indicated on the DL channel for the UE supporting eIMTA can be solved. The detailed operations of the process 70 can be referred to the above, and are not narrated herein for brevity.

To sum up, the communication device supporting eIMTA applies the UL/DL configuration indicated in the system information when the UL/DL configuration of the system information changes or the certain conditions occurs (e.g. the RRC connection reestablishment procedure is triggered or the radio link failure is detected). As a result, the problem of the inconsistency between the UL/DL configuration indicated in the system information and that indicated on the DL channel for the UE supporting eIMTA can be solved Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling an uplink/downlink (UL/DL) configuration for a communication device which supports Enhanced Interference Mitigation and Traffic Adaptation (eIMTA) function, the method comprising:
receiving a first cell-specific UL/DL configuration in first system information from a first cell in an idle mode;
applying the first cell-specific UL/DL configuration in the first system information;
receiving a second user-equipment-specific UL/DL configuration on a physical DL control channel from the first cell in a connected mode;
applying the second user-equipment-specific UL/DL configuration on the physical DL control channel instead of the first cell-specific UL/DL configuration in the first system information;
receiving a third cell-specific UL/DL configuration in second system information from the first cell in the connected mode;
applying the third cell-specific UL/DL configuration in the second system information instead of the second user-equipment-specific UL/DL configuration on the physical DL control channel, when the first cell-specific UL/DL configuration in the first system information and the third cell-specific UL/DL configuration in the second system information are different; and
keeping applying the second user-equipment-specific UL/DL configuration on the physical DL control channel, when the first cell-specific UL/DL configuration in the first system information and the third cell-specific UL/DL configuration in the second system information are the same.

2. The method of claim 1, wherein the step of receiving the third cell-specific UL/DL configuration in the second system information from the first cell in the connected mode comprises:
performing a radio resource control (RRC) connection reestablishment procedure; and
receiving the third cell-specific UL/DL configuration in the second system information from the first cell when performing the RRC connection reestablishment procedure.

3. The method of claim 2, further comprising:
releasing the second user-equipment-specific UL/DL configuration on the physical DL control channel when the RRC connection reestablishment procedure is triggered.

4. The method of claim 1, wherein the step of receiving the second user-equipment-specific UL/DL configuration on the physical DL control channel from the first cell in the connected mode comprises:
receiving a message comprising an enhanced interference management & traffic adaptation (eIMTA) configuration; and
receiving the second user-equipment-specific UL/DL configuration on the physical DL control channel according to the eIMTA configuration in the connected mode.

5. The method of claim 4, wherein the eIMTA configuration comprises a radio network temporary identifier (RNTI) for receiving the second user-equipment-specific UL/DL configuration on the physical DL control channel.

6. The method of claim 4, further comprising:
releasing the eIMTA configuration after applying the third cell-specific UL/DL configuration in the second system information.

7. A method of handling an uplink/downlink (UL/DL) configuration for a communication device which supports Enhanced Interference Mitigation and Traffic Adaptation (eIMTA) function, the method comprising:
receiving a first cell-specific UL/DL configuration in first system information from a first cell in an idle mode;
applying the first cell-specific UL/DL configuration in the first system information;
receiving a second user-equipment-specific UL/DL configuration on a physical DL control channel from the first cell in a connected mode;
applying the second user-equipment-specific UL/DL configuration on the physical DL control channel instead of the first cell-specific UL/DL configuration in the first system information;
performing a radio resource control (RRC) connection reestablishment procedure with the first cell when detecting at least one of a radio link failure, an integrity check failure and an RRC connection reconfiguration failure; and
applying the first cell-specific UL/DL configuration in the first system information instead of the second user-equipment-specific UL/DL configuration on the physical DL control channel when performing the RRC connection reestablishment procedure with the first cell.

8. The method of claim 7, wherein the step of applying the first cell-specific UL/DL configuration in the first system information when performing the RRC connection reestablishment procedure with the first cell comprises:
determining whether a first value tag of the first system information is equal to a second value tag broadcasted by the first cell when performing the RRC connection reestablishment procedure with the first cell; and
applying the first cell-specific UL/DL configuration in the first system information when the first value tag is equal to the second value tag.

9. The method of claim 8, further comprising:
receiving a second system information when the first value tag is different from the second value tag; and
applying a third cell-specific UL/DL configuration of the second system information.

10. The method of claim 7, wherein the step of receiving the second user-equipment-specific UL/DL configuration on the physical DL control channel from the first cell comprises:
receiving a message with an enhanced interference management & traffic adaptation (eIMTA) configuration; and
receiving the second user-equipment-specific UL/DL configuration in the physical DL control channel according to the eIMTA configuration.

11. The method of claim 10, wherein the eIMTA configuration comprises a radio network temporary identifier (RNTI) for receiving the second user-equipment-specific UL/DL configuration on the physical DL control channel.

12. The method of claim 10, further comprising:
releasing the eIMTA configuration after applying the first cell-specific UL/DL configuration in the first system information.

13. A communication device which supports Enhanced Interference Mitigation and Traffic Adaptation (eIMTA) function and is utilized for a wireless communication system, comprising:
a processing means; and
a storage unit, coupled to the processing means, for storing a program code, wherein the program code instructs the processing means to execute the following step:
receiving a first cell-specific UL/DL configuration in first system information from a first cell in an idle mode;
applying the first cell-specific UL/DL configuration in the first system information;
receiving a second user-equipment-specific UL/DL configuration on a physical DL control channel from the first cell in a connected mode;
applying the second user-equipment-specific UL/DL configuration on the physical DL control channel instead of the first cell-specific UL/DL configuration;
receiving a third cell-specific UL/DL configuration in second system information from the first cell in the connected mode;
applying the third cell-specific UL/DL configuration in the second system information instead of the second user-equipment-specific UL/DL configuration on the physical DL control channel, when the first cell-specific UL/DL configuration in the first system information and the third cell-specific UL/DL configuration in the second system information are different; and
keeping applying the second user-equipment-specific UL/DL configuration on the physical DL control channel, when the first cell-specific UL/DL configuration in the first system information and the third cell-specific UL/DL configuration in the second system information are the same.

14. The communication device of claim 13, wherein the step of receiving the third cell-specific UL/DL configuration in the second system information from the first cell in the connected mode comprises:
performing a radio resource control (RRC) connection reestablishment procedure; and
receiving the third cell-specific UL/DL configuration in the second system information from the first cell when performing the RRC connection reestablishment procedure.

* * * * *